United States Patent
Jacobsen et al.

(10) Patent No.: US 7,309,677 B2
(45) Date of Patent: Dec. 18, 2007

(54) SUPPORTED POLYMERISATION CATALYSTS

(75) Inventors: Grant Berent Jacobsen, Bouc Bel Air (FR); Brian Stephen Kimberley, Bouche du Rhone (FR); Sergio Mastroianni, Martigues (FR); Michael John Taylor, Sunbury on Thames (GB)

(73) Assignee: B.P. Chemicals Limited, Middlesex (GB)

( * ) Notice: Subject to any disclaimer, the term of this patent is extended or adjusted under 35 U.S.C. 154(b) by 0 days.

(21) Appl. No.: 10/523,828

(22) PCT Filed: Aug. 14, 2003

(86) PCT No.: PCT/GB03/03572

§ 371 (c)(1),
(2), (4) Date: Feb. 8, 2005

(87) PCT Pub. No.: WO2004/018531

PCT Pub. Date: Mar. 4, 2004

(65) Prior Publication Data

US 2006/0154808 A1     Jul. 13, 2006

(30) Foreign Application Priority Data

Aug. 20, 2002  (EP) ................... 02358017

(51) Int. Cl.
*C08F 10/00* (2006.01)
*C08F 4/64* (2006.01)

(52) U.S. Cl. ............ 502/152; 502/103; 502/117; 502/118; 502/104; 502/150; 526/172; 526/161; 526/134

(58) Field of Classification Search ........... 502/103, 502/104, 117, 150
See application file for complete search history.

(56) References Cited

U.S. PATENT DOCUMENTS

| 5,346,925 | A | * | 9/1994 | Sugano et al. ............... 521/54 |
| 5,783,512 | A | * | 7/1998 | Jacobsen et al. ............ 502/124 |
| 5,939,347 | A | * | 8/1999 | Ward et al. ................. 502/104 |
| 6,087,293 | A | * | 7/2000 | Carnahan et al. ........... 502/158 |
| 6,271,165 | B1 | * | 8/2001 | Jacobsen et al. ............ 502/104 |
| 6,475,945 | B1 | * | 11/2002 | Carnahan et al. ............. 502/87 |
| 6,544,919 | B1 | * | 4/2003 | Tagge et al. ................ 502/113 |
| 6,605,561 | B1 | * | 8/2003 | Saudemont et al. ........ 502/120 |
| 6,696,379 | B1 | * | 2/2004 | Carnahan et al. ........... 502/102 |
| 6,774,079 | B1 | * | 8/2004 | Taylor et al. ............... 502/104 |
| 6,818,712 | B2 | | 11/2004 | Mealares et al. |
| 6,943,226 | B2 | * | 9/2005 | Tagge et al. ................ 526/114 |
| 2003/0181317 | A1 | * | 9/2003 | Tagge et al. ................ 502/113 |
| 2005/0113517 | A1 | * | 5/2005 | Tayano et al. .............. 525/191 |
| 2005/0209096 | A1 | | 9/2005 | Jacobsen et al. |

FOREIGN PATENT DOCUMENTS

| WO | WO 96/28480 | 9/1996 |
| WO | WO 97/19959 | 6/1997 |
| WO | WO 97/43323 | 11/1997 |
| WO | WO 99/28353 | 6/1999 |

OTHER PUBLICATIONS

Watanabe, "Method for Producing Olefinic Polymer," Patent Abstracts of Japan of JP 2001-294608, (Oct. 23, 2001).
Koike, "Method for Manufacturing Olefin Polymer," Patent Abstracts of Japan of JP 2001-302716, (Oct. 31, 2001).
Iwashita, "Catalyst for Olefin Polymerization and Polymerization of Olefin Using the Catalyst," Patent Abstracts of Japan of JP 11 166009, (Jun. 22, 1999).

* cited by examiner

*Primary Examiner*—C. Melissa Koslow
(74) *Attorney, Agent, or Firm*—Finnegan, Henderson, Farabow, Garrett & Dunner, L.L.P.

(57) ABSTRACT

A method for the preparation of a supported transition metal catalyst system which includes the steps of: (i) mixing together in a suitable solvent (a) an aluminoxane and (b) an ionic activator containing a cation and an anion, wherein the anion has at least one substituent containing a moiety having an active hydrogen, (ii) addition of the mixture from step (i) to a support material, and (iii) addition of a transition metal compound in a suitable solvent. The use of tetraisobutyla-luminoxane as the aluminoxane results in a more stable activity profile and improved polymer properties in particular melt strength.

15 Claims, No Drawings

SUPPORTED POLYMERISATION CATALYSTS

BACKGROUND OF THE INVENTION

The present invention relates to supported catalysts suitable for the polymerisation of olefins and in particular to supported metallocene catalysts providing advantages for operation in gas phase processes.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature.

There have been developed several different families of metallocene complexes. In earlier years catalysts based on bis (cyclopentadienyl) metal complexes were developed examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis (cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or compounds based on boron compounds. Examples of the latter are borates such as trialkyl-substituted ammonium tetraphenyl- or tetrafluorophenyl-borates. Catalyst systems incorporating such borate activators are described in EP 561479, EP 418044 and EP 551277.

The above metallocene complexes may be used for the polymerisation of olefins in solution, slurry or gas phase. When used in the gas phase the metallocene complex and/or the activator are suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with an organometallic compound such as triethylaluminium (TEA) followed by subsequent treatment with the support and the metallocene.

Among the organometallic compounds disclosed in WO 98/27119 are aluminoxanes, in particluar methyl aluminoxane (MAO) although no further details nor exemplification of such compounds is described.

WO 99/28353 describes similar catalyst systems comprising anions containing active hydrogens which are also contacted with trialkylaluminium compounds.

SUMMARY OF THE INVENTION

We have now surprisingly found that the use of aluminoxanes as the organometallic compound has particular advantages relating to the activity profile of the resultant supported transition metal catalysts.

Thus according to the present invention there is provided a method for the preparation of a supported transition metal catalyst system said method comprising the steps of:
(i) mixing together in a suitable solvent
  (a) an aluminoxane and
  (b) an ionic activator comprising a cation and an anion wherein the anion has at least one substituent comprising a moiety having an active hydrogen,
(ii) addition of the mixture from step (i) to a support material, and
(iii) addition of a transition metal compound in a suitable solvent.

DETAILED DESCRIPTION OF THE INVENTION

The cation of the ionic activator may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonmoium, tri(n-butyl) ammonium and similar. Also suitable are N.N-dialkylammonium cations such as N,N-dimethylanilinium cations.

Particularly suitable are those cations having longer alkyl chains such as dihexyldecylmethylammonium, dioctadecylmethylammonium, ditetradecylmethylammonium, bis(hydrogenated tallow alkyl) methylammonium and similar.

Examples of suitable anions include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Particular preferred ionic activators are alkylammonium tris(pentafluorophenyl)4-(hydroxyphenyl)borates. A particularly preferred activator is bis(hydrogenated tallow alkyl)methyl ammonium tris(pentafluorophenyl)(4-hydroxyphenyl)borate.

Suitable activators of this type are described in WO 98/27119 the relevant portions of which are incorporated herein by reference.

Particular preferred ionic activators are alkylammonium tris(pentafluorophenyl)4-(hydroxyphenyl)borates. A particularly preferred activator is bis(hydrogenated tallow alkyl)methyl ammonium tris(pentafluorophenyl)(4-hydroxyphenyl)borate.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminum, in a suitable organic medium such as benzene or an aliphatic hydrocarbon.

The preferred aluminoxane is tetraisobutyaluminoxane (tetraisobutyldialuminoxane).

The preferred molar ratio of the aluminoxane (aluminium) to ionic activator (boron) is typically in the range 20:0.1 and preferably in the range 10:0.2.

Suitable solvents for use in the present invention include alkanes eg isohexane or cyclohexane or aromatic solvents eg—toluene.

According to another aspect of the present invention there is provided a catalyst component comprising the reaction product of
(a) an aluminoxane and
(b) an ionic activator comprising a cation and an anion wherein the anion has at least one substituent comprising a moiety having an active hydrogen, Suitable transition metal compounds may be those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis(2,6-diisopropylanil)FeCl$_2$], 2.6-diacetylpyridinebis(2,4,6-trimethlylanil)FeCl$_2$, and [2,6-diacetylpyridinebis(2,6-diisopropylanil)CoCl$_2$].

Other catalysts include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

LxMQn where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl)zirconium dichloride, bis(pentamethyl)cyclopentadienyl dichloride, or may be bridged eg. ethylene bis(indenyl)zirconium dichloride or dimethylsilyl(indenyl)zirconium dichloride.

Other suitable bis(cyclopentadienyl)metallocene complexes are those bis(cyclopentadienyl)diene complexes described in WO 96/04290. Examples of such complexes are bis(cyclopentadienyl)zirconium(2.3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

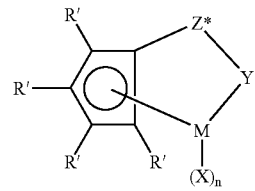

wherein:—
R' each occurrence is independently selected from hydrogen, hydrocarbyl, silyl, germyl, halo, cyano., and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl(tetramethyl-$\eta^5$-cyclopentadienyl)silanetitanium dichloride and (2-methoxyphenylamido)dimethyl(tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium[tri(tertiary butyl)phosphinimine]dichloride.

Another type of polymerisation catalyst suitable for use in the present invention are monocyclopentadienyl complexes comprising heteroallyl moieties such as zirconium(cyclopentadienyl)tris(diethylcarbamates) as described in U.S. Pat. No. 5,527,752 and WO 99/61486.

Particularly preferred metallocene complexes for use in the preparation of the supported catalysts of the present invention may be represented by the general formula:

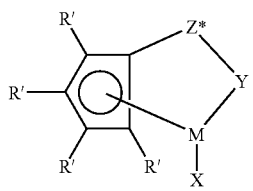

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, tetrahydrofluorenyl, or octahydrofluorenyl group.

Highly preferred Y groups are nitrogen or phosphorus containing groups containing a group corresponding to the formula —N(R″)— or —P(R″)—wherein R″ is $C_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido)(tetramethyl-$\eta^5$-cyclopentadienyl)dimethyl silanetitanium-$\eta^4$-1,3-pentadiene.

Suitable support materials include inorganic metal oxides or alternatively polymeric supports may be used.

The most preferred support material for use with the supported catalysts according to the process of the present invention is silica. Suitable silicas include Ineos ES70 and Grace-Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

A particularly preferred trialkyl aluminium compound for use in the present invention is triisobuylaluminium.

The support material is pretreated with the organometallic compound at a temperature of −20° C. to 150° C. and preferably at 20° C. to 100° C.

In a preferred process according to the present invention, the supported catalyst is prepared by use of a one-pot procedure. This allows for a more efficient procedure as well as having economic benefits.

By one-pot is meant a preparation carried out without the need for washing steps and typically wherein the contact between the support material, ionic activator and metallocene is performed in a single reaction vessel.

The one-pot procedure may also incorporate a final precipitation step, using for example the addition of hexane to the mixture resulting from step (iii). In this procedure a slurry or mud of the catalyst is obtained which may be used directly to inject the catalyst into the polymerisation reactor.

The molar ratio of transition metal compound to ionic activator employed in the method of the present invention may be in the range 1:10000 to 100:1. A preferred range is from 1:5000 to 10:1 and most preferred from 1:10 to 10:1.

The supported transition metal catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c)

mixtures of ethylene and propylene and (d) mixtures of (a), (b) or (c) with one or more other alpha-olefins, said process performed in the presence of a supported transition metal catalyst system as hereinbefore described.

The process of the present invention may be directed to the solution, slurry or gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The preferred process for the present invention is the gas phase.

Suitable gas phase processes of the present invention include the polymerisation of olefins, especially for the homopolymerisation and the copolymerisation of ethylene and α-olefins for example 1-butene, 1-hexene, 4-methyl-1 pentene and 1-ocetene are well known in the art. Particularly preferred gas phase processes are those operating in a fluidised bed. Examples of such processes are described in EP 89691 and EP 699213, the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported metallocene catalyst system prepared as hereinbefore described.

The present invention will now be further illustrated with reference to the following examples:

Abbreviations
TEA triethylaluminium
TiBAO tetraisobutylaluminoxane
TiBA triisobutylaluminium
Ionic Activator A [N(H)Me($C_{18-22}H_{37-45}$)$_2$][B($C_6F_5$)$_3$ ($C_6H_4OH$)]
Complex A ($C_5Me_4SiMe_2N^tBu$)Ti($\eta^4$-1,3-pentadiene)

EXAMPLE 1

Catalyst Preparation

To 3 g. of Ineos ES70 silica (previously calcined at 500° C. for 5 hours under nitrogen, pore volume 1.55 ml/g) was added a solution made with 2.81 ml of a hexane solution of triisobutylaluminium (TiBA), 0.96 mol/L and 1.84 ml of hexane. The mixture was allowed to react for 2.5 hours under agitation then dried under vacuum.

1.51 ml of Ionic Activator A (previously dried by prolonged contact with molecular sieves 4A) was reacted with 0.31 ml. of TiBAO solution in cyclohexane (0.812 mol/L) (molar ratio of TiBAO/activator=2; Al/B ratio=4).

1.82 ml of this solution was slowly impregnated (15 min) to the above TiBA treated silica and manually agitated until no lumps were visible. The solution was held for 30 min.

0.72 ml of Complex A solution in heptane (9.17% wt) was then slowly added (15 min) and manually agitated until no lumps were visible. Then solution was held for 60 min. and then the catalyst dried under vacuum.

The resultant catalyst had [Ti]=40 μmol/g and [Al]=0.83 mmol/g.

EXAMPLE 2

Catalyst Preparation

The procedure of Example 1 was repeated except that the final dried catalyst was reslurried in hexane in an amount of 2.5 ml hexane to 1 g of catalyst followed by holding for 45 min. after which time the catalyst was dried under vacuum.

EXAMPLE 3

Polymerisation Data

The catalysts from Examples 1 and 2 were tested for ethylene-1-hexene copolymerisation as follows:

A 2.5 l double jacketed thermostatic stainless steel autoclave was purged with nitrogen at 70° C. for at least one hour. 200 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.

Typical conditions are as follows:
Temperature: 70° C.
Ethylene pressure: 6.5 b
P(1-hexene)/P(ethylene): 0.004-0.008
Hydrogen: 70-100 ml added during the gas phase composition

| Catalyst | Average Activity (g/g · h · bar) | Activity at 1 h (g/g · h · bar) |
|---|---|---|
| Example 1 | 63 | 50 |
| Example 2 | 60 | 40 |

Both the catalysts from the present invention showed low decay activity profiles.

The polymer from Example 2 had the following properties:
MI(2.16)=1 g/10 min.
Density=0.921 g/ml
Melt strength(16 Mpa) 5.9 cN A low exotherm (56° C./g catalyst) was observed compared with a typical temperature in the region of 150° C./g catalyst for prior art catalysts.

The invention claimed is:

1. A method for the preparation of a supported transition metal catalyst system, the method comprising the steps of:

(i) mixing together in a suitable solvent
   (a) an aluminoxane and
   (b) an ionic activator having a cation and an anion, wherein the anion has at least one substituent containing a moiety having an active hydrogen,
(ii) adding the mixture from step (i) to a support material, and
(iii) adding a transition metal compound in a suitable solvent to the support material of (ii).

2. The method according to claim 1, wherein the ionic activator is an alkylammonium tris (pentafluorophenyl) (4-hydroxyphenyl) borate.

3. The method according to claim 1, wherein the aluminoxane is tetraisobutyldialuminoxane.

4. The method according to claim 2, wherein the molar ratio of the aluminoxane (aluminium) to ionic activator (boron) is in the range 20:0.1.

5. The method according to claim 1, wherein the support material is silica.

6. The method according to claim 5, wherein the silica is pretreated with an organoaluminium compound.

7. The method according to claim 6, wherein the organoaluminium compound is triisobutylaluminium.

8. The method according to claim 1, wherein the transition metal compound is a metallocene.

9. The method according to claim 8, wherein the metallocene has the formula:

$$CpMX_n$$

wherein Cp is a single cyclopentadienyl or substituted cyclopentadienyl group optionally covalentyl bonded to M through a substituent, M is a Group VIA metal bound in a $\eta^5$ bonding mode to the cyclopentadienyl or substituted cyclopentadienyl group, X each occurance is hydride or a moiety selected from the group consisting of halo, alkyl, aryl, aryloxy, alkoxy, alkoxyalkyl, amidoalkyl, and siloxyalkyl having up to 20 non-hydrogen atoms and neutral Lewis base ligands having up to 20 non-hydrogen atoms or optionally one X together with Cp forms a metallocycle with M and n is dependent upon the valency of the metal.

10. The method according to claim 8, wherein the metallocene is represented by the general formula:

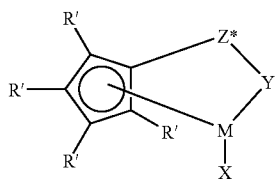

wherein:
R' each occurrence is independenfly selected from the group consisting of hydrogen, hydrocarbyl, silyl, germyl, halo, cyano, and combinations thereof, said R' having up to 20 nonhydrogen atoms, and optionally; two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a Π-complex with M;

V is —O—, —S—, —NR*—, or —PR*—,

M is titanium or zirconium in the +2 formal oxidation state;

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independentiy hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or an R' group from Z* and an R* group from Y form a ring system.

11. A process for the polymerisation of olefin monomers, comprising polymerising an olefin monomer selected from the group consisting of (a) ethylene, (b) propylene (c) mixtures of ethylene and propylene and (d) mixtures of (a), (b) or (c) with one or more other alpha-olefins-under polymerisation conditions and in the presence of a supported transition metal catalyst system prepared by:
(i) mixing together in a suitable solvent
   (a) an aluminoxane and
   (b) an ionic activator having a cation and an anion, wherein the anion has at least one substituent containing a moiety having an active hydrogen,
(ii) adding the mixture from step (i) to a support material, and
(iii) adding a transition metal compound in a suitable solvent to the support material of (ii).

12. A process for the (co-)polymerization of ethylene, comprising polymerising ethylene or copolymerising ethylene and α-olefins having from 3 to 10 carbon atoms under polymerisation conditions and in the presence of a supported catalyst system prepared by:
(i) mixing together in a suitable solvent
   (a) an aluminoxane and
   (b) an ionic activator having a cation and an anion, wherein the anion has at least one substituent containing a moiety having an active hydrogen,
(ii) adding the mixture from step (i) to a support material, and
(iii) adding a transition metal compound in a suitable solvent to the support material of (ii).

13. The process according to claim 12, wherein the α-olefin is 1-butene, 1-hexene, 4-methyl-1-pentene or 1-octene.

14. The process according to claim 11 or 12, wherein the process is performed in the solution, slurry or gas phase.

15. The process according to claim 14, wherein the process is performed in a fluidised bed gas phase reactor.

* * * * *